(12) United States Patent
Morrison et al.

(10) Patent No.: US 7,587,725 B2
(45) Date of Patent: Sep. 8, 2009

(54) METHODS AND SYSTEMS FOR CREATING AND COMMUNICATING WITH COMPUTER PROCESSES ON REMOTE SYSTEMS

(75) Inventors: Conor P. Morrison, Seattle, WA (US); Sivaprasad V Padisetty, Redmond, WA (US); Arvind Gopalan, Hacienda Heights, CA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/042,853

(22) Filed: Jan. 24, 2005

(65) Prior Publication Data

US 2005/0138624 A1 Jun. 23, 2005

Related U.S. Application Data

(62) Division of application No. 09/872,257, filed on Jun. 1, 2001, now Pat. No. 7,089,561.

(51) Int. Cl.
*G06F 9/44* (2006.01)
(52) U.S. Cl. ....................... 719/330; 719/328
(58) Field of Classification Search ......... 719/310–316, 719/328, 330; 718/100–104; 709/203
See application file for complete search history.

(56) References Cited

U.S. PATENT DOCUMENTS

| | | | | |
|---|---|---|---|---|
| 5,522,077 A | * | 5/1996 | Cuthbert et al. | 707/103 R |
| 5,706,516 A | * | 1/1998 | Chang et al. | 719/314 |
| 5,717,926 A | * | 2/1998 | Browning et al. | 718/104 |
| 6,003,066 A | * | 12/1999 | Ryan et al. | 709/201 |
| 6,189,046 B1 | * | 2/2001 | Moore et al. | 719/315 |
| 6,282,581 B1 | * | 8/2001 | Moore et al. | 719/316 |
| 6,292,820 B1 | * | 9/2001 | Korn | 718/100 |
| 7,089,561 B2 | * | 8/2006 | Morrison et al. | 719/312 |

* cited by examiner

*Primary Examiner*—Van H Nguyen
(74) *Attorney, Agent, or Firm*—Lee & Hayes, PLLC (57) ABSTRACT

An application programming interface (API) presents services of a system to applications. The API is usable with all processes, local and remote, and is transparent with respect to the location of processes. A process table stores information about processes created using the system. The process table supports centralized process control and peer-to-peer process communication and synchronization. Each process is assigned a Universally Unique Identifier (UUID) that uniquely identifies the process no matter the computing device on which it runs. A parent UUID and a group UUID may be attached to the process and used for enforcing dependencies (e.g., for halting the process and all of its child processes) and for managing arbitrary, user-defined groups, respectively. A global event is associated with each process. When a process receives this event, it performs a controlled shutdown, cleans up, and reports status.

2 Claims, 5 Drawing Sheets

Process Table 108

|  | UUID | Process ID | Parent UUID | Group UUID | Creation Time | Heartbeat Time | Source Device | Target Device | Process Type |
|---|---|---|---|---|---|---|---|---|---|
| Process 1: | 12345 | 54321 | --- | 00003 | 12:00:00 | 14:24:03 | 100 | 100 | WTT |
| Process 2: | 23456 | 65432 | 12345 | 00003 | 12:00:01 | 14:24:45 | 100 | 100 | WTT |
| Process 3: | 34567 | 76543 | 23456 | 00003 | 12:00:02 | 14:24:02 | 100 | 100 | WTT |
| ... |  |  |  |  |  |  |  |  |  |
| Process 6: | 67890 | 09876 | 34567 | 00003 | 12:00:05 | --- | 100 | 104 | WTT |

Process Table 112

|  | UUID | Process ID | Parent UUID | Group UUID | Creation Time | Heartbeat Time | Source Device | Target Device | Process Type |
|---|---|---|---|---|---|---|---|---|---|
| Process 6: | 67890 | 22334 | 34567 | 00003 | 12:00:25 | 14:24:56 | 104 | 104 | WTT |
| Process 7: | 78901 | 10987 | --- | --- | 13:34:02 | 00:00:00 | 104 | 104 | Non-WTT |

FIG. 4

METHODS AND SYSTEMS FOR CREATING AND COMMUNICATING WITH COMPUTER PROCESSES ON REMOTE SYSTEMS

CROSS-REFERENCE TO RELATED APPLICATION(S)

This application is a divisional application of and claims the benefit of U.S. patent application Ser. No. 09/872,257, filed Jun. 1, 2001, which issued as U.S. Pat. No. 7,089,561 on Aug. 8, 2006, content of which is hereby incorporated by reference.

TECHNICAL FIELD

The present invention relates generally to computer operating systems, and, more particularly, to communications mechanisms for computer processes.

BACKGROUND OF THE INVENTION

Often, a process running on one computing device may need to create or communicate with a process on another device. The use of remote devices may simply be a convenience as, for example, when a program requires so many resources that it cannot effectively be run on one device. The work of the program may then be shared among several devices by invoking processes on the remote devices to perform pieces of the overall task. The results produced by the remote processes are collected in a central, coordinating process. In other cases, the use of remote devices is inherent in the nature of the work at hand. For example, communications protocols cannot be fully tested on one device. A script for testing a protocol may be run on a test host device. To perform the test, the script may start an application on a second device, start a peer application on a third device, and start an application on a fourth device to monitor the communications between the applications on the second and third devices.

Methods exist for a process running on a host computing device to create a process on a remote device. However, these methods provide much less functionality for communicating with the remote process than is available for processes running locally. Often, these methods only allow the host device to start the remote process, receive output from it, and terminate it. The termination is uncontrolled, not giving the remote process a chance to clean up before exiting. Another drawback of these methods is the distinction they draw between local and remote processes. This makes it very difficult to debug a program on one device and know that it will work correctly when it is running on multiple devices.

Even for purely local processes, current methods of communication are in some ways inadequate. Local processes may be limited in their ability to log ongoing status information. Termination of local processes may be as uncontrolled as for remote processes.

What is needed is a method that enhances the communications abilities of all processes and that provides the full functionality of local processes to processes on remote computing devices. The method would ideally hide the distinction between local and remote processes, allowing all processes to be treated in the same manner.

SUMMARY OF THE INVENTION

The above problems and shortcomings, and others, are addressed by the present invention, which can be understood by referring to the specification, drawings, and claims. The present invention provides mechanisms for creating and communicating with computer processes. An application programming interface (API) presents the services of the invention to applications. The API is usable with all processes, local and remote, and is transparent with respect to the location of processes. The invention also works with processes that do not use the API, although some enhanced services are available only to processes using the API.

A process table stores information about processes created using the invention. The process table is accessible by all processes, local and remote, and supports centralized process control and peer-to-peer process communication and synchronization. Locks are used to synchronize access to the process table.

Each process is assigned a Universally Unique Identifier (UUID) that uniquely identifies the process no matter the computing device on which it runs. A parent UUID and a group UUID may be attached to the process and used for enforcing dependencies (e.g., for waiting for or halting the process and all of its child processes) and for managing arbitrary, user-defined groups, respectively.

A global event is associated with each process. When a process receives this event, it performs a controlled shutdown, cleans up, and reports its status. Users define other global events and assign meanings to them. Global events form a generally useful message-passing mechanism.

At frequent intervals, processes and process threads log heartbeat entries in the process table. If a process or thread stops updating this field, then other processes can assume that this process or thread broke into the debugger. A process may log other information such as the number of its threads and the current status of the threads.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Creating and Communicating with Local and Remote Processes

The present invention provides services for creating and communicating with computer processes, whether the processes are all running locally on one computing device or are scattered among several remote devices. Information about processes is gathered into data structures called "process tables." The process tables are accessible by all processes, local and remote, and support centralized process control and peer-to-peer process communication and synchronization.

This section provides an overview of the mechanisms and capabilities of the invention and includes implementation details only when they are useful to illustrate the discussion. The following section expands on this overview by presenting, in great detail, an exemplary embodiment of the invention.

Figure 1:
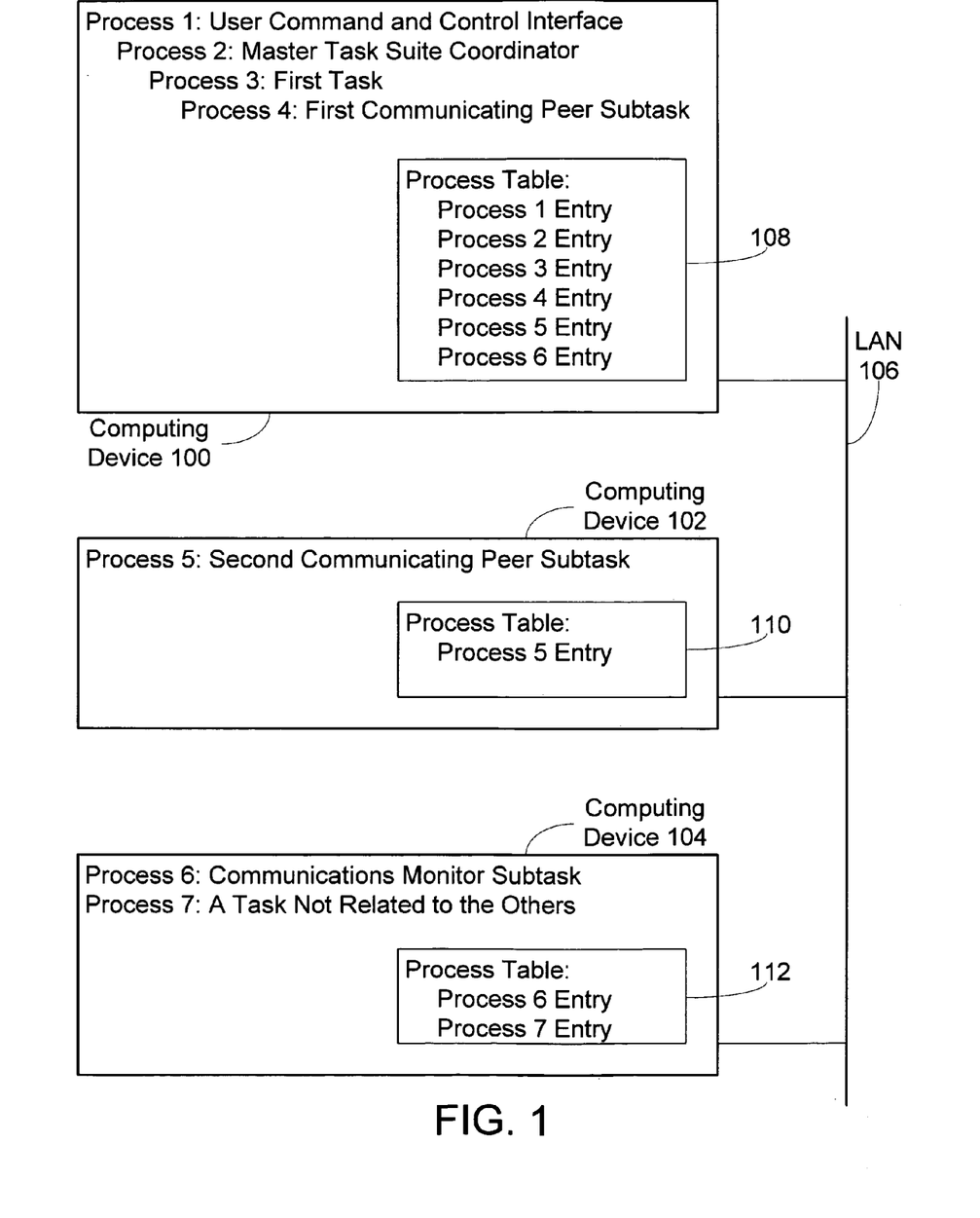
FIG. 1 is a schematic drawing of an exemplary environment in which the invention may be practiced: multiple computing devices running multiple processes and communicating with each other.

FIG. 1 shows an exemplary environment in which the invention may be practiced. It is a schematic drawing showing multiple computing devices 100, 102, and 104 running multiple processes and communicating with each other via a LAN 106. Computing device 100 is running four processes. The indentation is intended to show that Process 1 invokes Process 2, Process 2 invokes Process 3, and Process 3 invokes Process 4. For purposes of illustration, Process 1 is a command and control interface program. The user of the computing device 100 invokes other processes through this interface. Here, the user invokes Process 2 which coordinates and schedules jobs that may comprise several tasks. Process 2 invokes Process 3 which is a communications job. To do its work, Process 3 invokes Processes 4, 5, and 6. Processes 4 and 5 communicate with each other via the LAN 106, Process 4 running on computing device 100 and Process 5 running on computing device 102. Process 6 monitors the communications between Processes 4 and 5 and runs on computing device 104. The choice of a communications job is merely illustrative as the invention works with all single- or multi-process jobs.

Each computing device runs a service called "spsrv" that coordinates communications among the devices. The spsrv service listens for requests coming in to a device and processes them. These requests include requests to create a process, requests to provide updated status information, and requests to send information to a process. The spsrv service also sends out status updates and responses to enquiries. This service generally makes communications details transparent so that an application can deal with processes regardless of the device on which they are running. Details specific to remote communications are discussed in the section below entitled "Specific Considerations When Communicating with Remote Processes."

Each computing device contains a process table that has an entry for each process running on, or invoked by a process running on, the computing device. The process table 108 of computing device 100 contains six entries. The first four entries are for Processes 1 through 4 which run on the device. In addition, the process table contains entries for Process 5 and 6 which do not run locally but were invoked by Process 3 which does run locally. Process table 110 on computing device 102 contains an entry for Process 5 because that process runs locally, even though the process was invoked on another device. Similarly, process table 112 on computing device 104 contains entries for Process 6, running locally though invoked remotely, and Process 7, running locally. Process 7 illustrates processes running on a computing device that have nothing to do with the job run by the user of computing device 100. Process tables are described in greater detail with reference to FIG. 4. For the moment, note that process tables are populated when a process is created and contain information useful for controlling and monitoring the processes.

Figure 2:
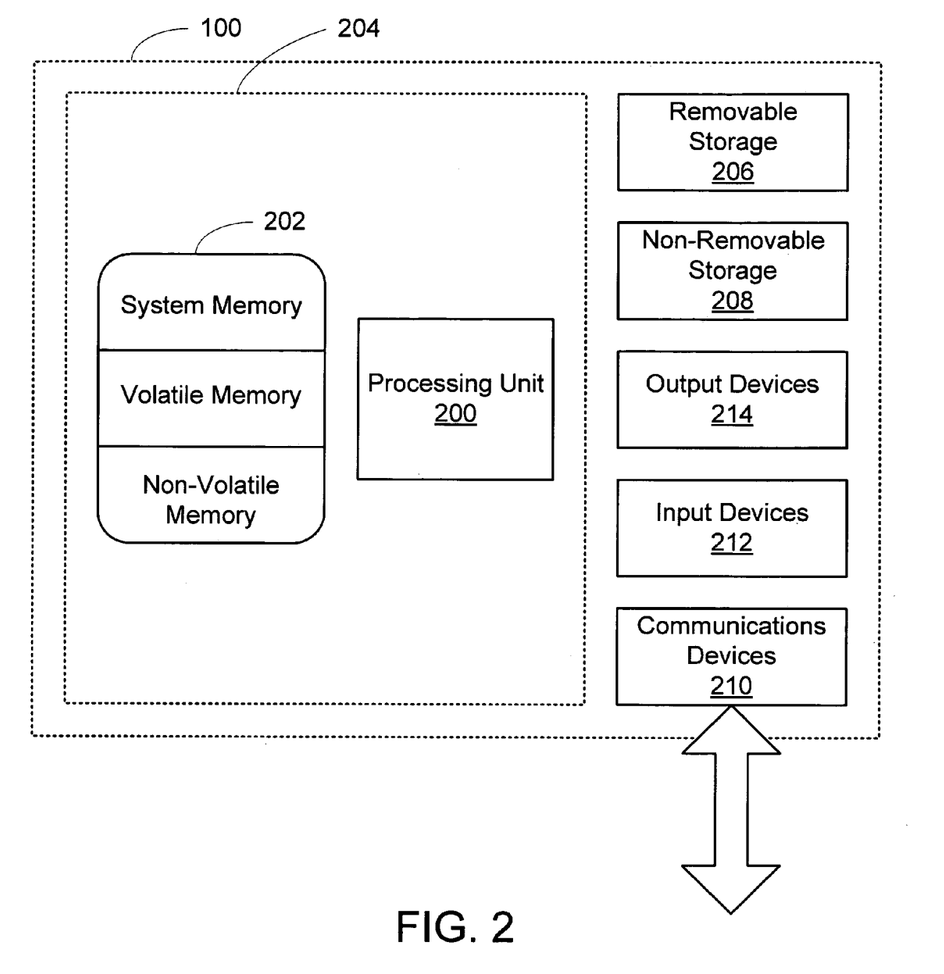
FIG. 2 is a block diagram generally illustrating an exemplary computer system that supports the present invention.

The computing devices 100, 102, and 104 of FIG. 1 may be of any architecture. FIG. 2 is a block diagram generally illustrating an exemplary computer system that supports the present invention. The computing device 100 is only one example of a suitable environment and is not intended to suggest any limitation as to the scope of use or functionality of the invention. Neither should the computing device 100 be interpreted as having any dependency or requirement relating to any one or combination of components illustrated in FIG. 2. The invention is operational with numerous other general-purpose or special-purpose computing environments or configurations. Examples of well-known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, computing device 100 typically includes at least one processing unit 200 and memory 202. The memory 202 may be volatile (such as RAM), non-volatile (such as ROM, flash memory, etc.), or some combination of the two. This most basic configuration is illustrated in FIG. 2 by the dashed line 204. The computing device may have additional features and functionality. For example, computing device 100 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by device 100. Any such computer storage media may be part of device 100. Device 100 may also contain communications connections 210 that allow the device to communicate with other devices. Communications connections 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks (including the LAN 106 of FIG. 1) and direct-wired connections, and wireless media such as acoustic, RF, infrared, and other wireless media. The term computer-readable media as used herein includes both storage media and communications media. The computing device 100 may also have input devices 212 such as a keyboard, mouse, pen, voice-input device, touch-input device, etc. Output devices 214 such as a display, speakers, printer, etc., may also be included. All these devices are well know in the art and need not be discussed at length here.

The services of the present invention are presented to applications by means of an Application Programming Interface (API). The API can be used with all processes, local and remote, and is transparent with respect to the location of a process. The API returns sensible values if a request fails because of a network problem and does not falter if remote devices are unavailable. If a process uses the API, then the process is called a "WINDOWS Test Technologies (WTT)-based process." The name "WTT" is of only historical interest, and the invention is not limited to use in the testing field or to use with Microsoft's "WINDOWS" operating systems. The invention works with any combination of WTT-based and non-WTT-based processes, although some enhanced services are available only to WTT-based processes. For purposes of this discussion, the services provided by the API are roughly divided into four major categories of communications tasks: creating processes, monitoring processes, waiting for processes, and sending signals to processes, especially termination signals.

Using the API, applications can create new processes and run them either on the local computing device or on a remote device. Each process is tagged by a Universally Unique Identifier (UUID) that uniquely identifies the process no matter the computing device on which it resides. In addition, a parent UUID and a group UUID may be assigned to the process and used for enforcing dependencies (e.g., for signaling the process and all of its child processes) and for managing arbitrary, user-defined groups, respectively. The process table stores information about processes created on the computing device, whether the process runs locally on the device or runs remotely. The process table is created as a memory-mapped file and is visible to all processes on the device. A global event is associated with each process created via the API and is used for process control and signaling.

Figure 3A:
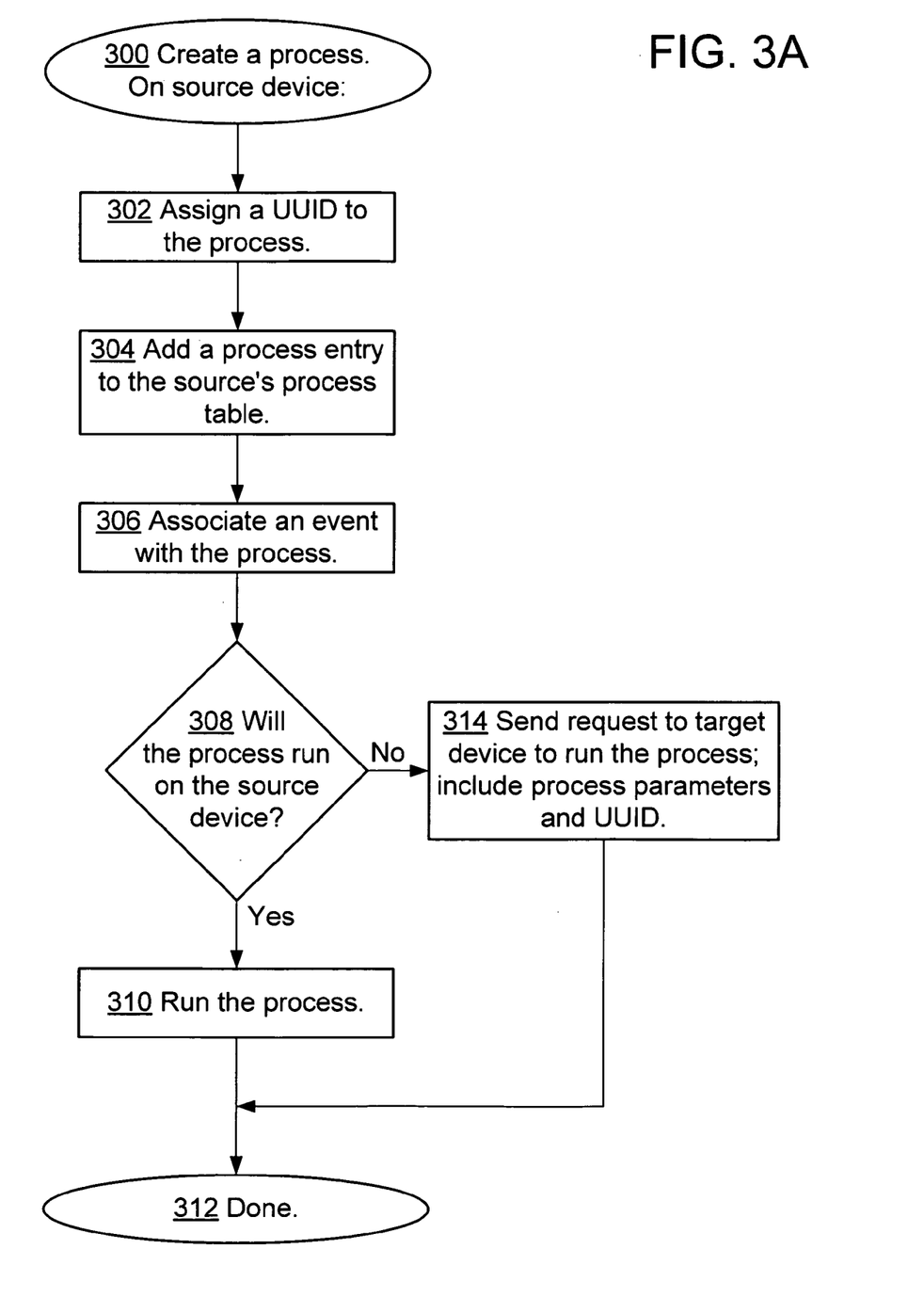
FIGS. 3A and 3B are flow charts showing the steps in creating a process using the invention.
Figure 3B:
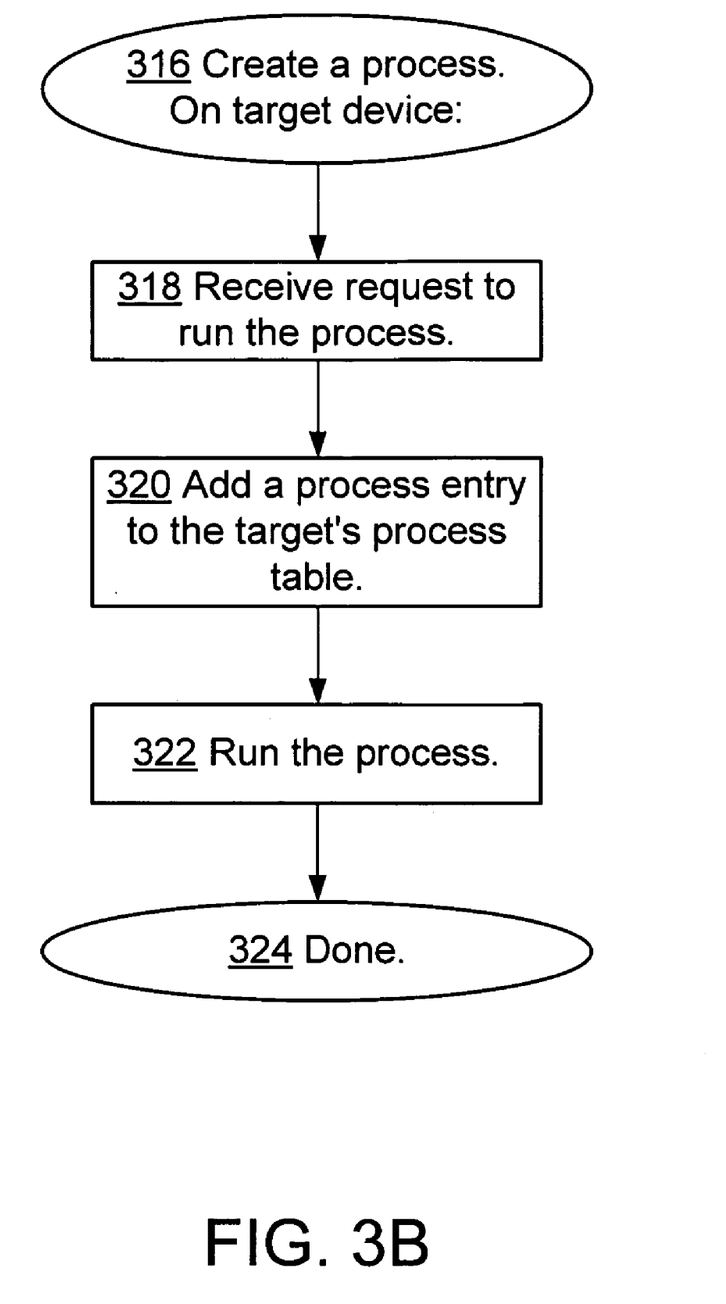

FIGS. 3A and 3B illustrate the steps taken when a process is created by means of calls to the API. In step 300 of FIG. 3A, the API is called to create a process. The call is made by a parent application running on the "source" computing device. Steps 302, 304, and 306 set up information associated with the new process and record that information in the process table on the source device. If desired, a group UUID, parent UUID, or other information can be added to the process table (not shown). Step 308 asks whether the new process will run on the source device or on a remote device. If the new process is to run on the source device, as, for example, when Process 3 in FIG. 1 invokes Process 4, the new process is started in step 310. Otherwise, step 314 sends pertinent information about the new process to the spsrv service running on the remote device, called the "target" device, on which the process will run. This is the case when Process 3 in FIG. 1 invokes Process 6. The information necessary for invoking Process 6 is sent from the source device 100 to the target device 104. FIG. 3B illustrates what happens on the target device when it receives a request from the source device to run a process. After receiving the request in step 318, the target device creates an entry for the process in its process table, step 320, and runs the process, step 322. Note that in the case where the source and target devices are distinct, the process table on each device has an entry for the process. Process 6 shows up both in the process table 108 on the source device 100 and in the process table 112 on the target device 104. This is an implementation detail and is not necessary for the invention, but it helps when monitoring and controlling remote processes, as discussed further below.

Figure 4:
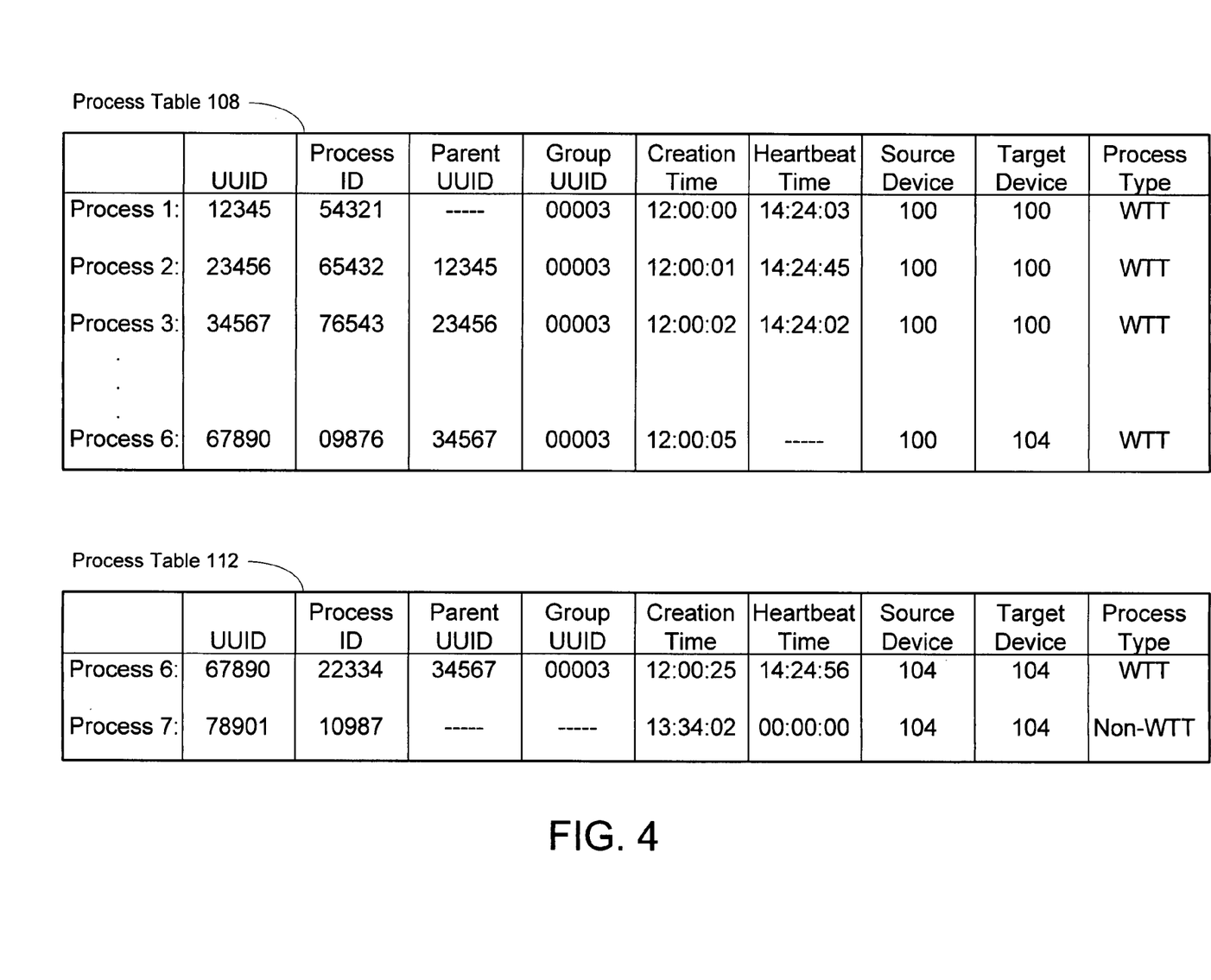
FIG. 4 is a schematic diagram of representative process tables.

FIG. 4 is a schematic diagram of representative process tables. The tables are populated to reflect the situation in FIG. 1. The first field shown, the UUID assigned to each process, is a useful key into the process tables. Next, the Process ID is assigned by the operating system when the process is created. Because the operating system may not understand the UUID, the Process ID is available when operating system calls need to be made in relation to a process. The Parent UUID and Group UUID are optional fields and are discussed above. Creation Time marks the moment when the process began running. Heartbeat Time stores the last time that a WTT-based process posted a heartbeat update. Uses of the heartbeat timer are discussed further below. The Source Device and Target Device fields identify the computing device where the process was invoked and where it runs, respectively. For local processes such as Process 3, these fields contain the same value. The fields also contain the same value in the process table on the target machine, as shown by the Process 6 entry in Process Table 112. The specific semantics of these two fields are unimportant, as long as the values uniquely identify the devices. Some possible values are the name of the computing device and its IP address. The final field shown, Process Type, is a flag showing whether the process is aware of this API. A Process Table may contain other fields, not shown, and some of these other fields are discussed below. The fields illustrated in FIG. 4 are, arguably, the basic fields used by the API.

Because a process table is accessible to all processes on the computing device, mechanisms exist for coordinating access to the table. One mechanism involves software locks, both for the entire table and for each individual row. For example, a process updating its heartbeat time can lock access to its row while it writes the current time into the Heartbeat Time field. When a process is created or deleted, the entire process table is locked so that a row can be added or deleted without interference.

At frequent intervals, for each process, a monitor thread logs heartbeat entries in the Heartbeat Time field in the local process table. Each thread in a process updates a local heartbeat and the monitor thread keeps track of these local heartbeats, updating the heartbeat field in the local process table if all the threads are updating their local heartbeats. If any thread deadlocks and stops updating its local heartbeat, the monitor thread detects this, logs the fact, and either breaks into the debugger or marks the process as requiring assistance. When an application wants to monitor the heartbeat of a process, the application begins by looking up the entry for the process in the process table on the computing device on which the application is running. The application reads the Target Device field to see where the process is running. Then, if the target device is the local device, the application reads the Heartbeat Time field in the local process table. Otherwise, the target device is distinct from the local device and the application sends a request to the spsrv service running on the target device asking it to send the value of the Heartbeat Time of the process. For example, if Process 3 in FIG. 1 wants to know whether Process 6 is still running normally, that is to say, is still logging heartbeats, Process 3 would consult Process Table 108 on its local computing device 100. Reading the entry for Process 6, Process 3 discovers that Process 6 is running remotely, on computing device 104. (See FIG. 4.) Process 3 formulates a request and sends it to the computing device 104. That device reads its process table 112 and reports to Process 3 that the Heartbeat Time field of Process 6 currently reads "14:24:56". Process 3 compares that heartbeat time (adjusted, if necessary, for time zone differences) to its local clock and decides whether Process 6 is running or has broken into the debugger.

In addition to its heartbeat, a process may log other information including the number of its threads, the current status of the threads, console output, log file output, etc. An application wishing to monitor this output can use the same techniques described above with respect to heartbeats. The application can also obtain ongoing status information by requesting that a copy of new information written by the process be sent to the application as it is written. Using parent and group UUIDs, an application can monitor all of the processes in a dependency list or in a user-defined process group.

A process may wait for other processes to achieve a specified status, for example, to complete their initialization or to terminate. The API provides a function that waits until the processes achieve the status or until a timeout period elapses. The function checks the heartbeat of all WTT-based processes and, if a process is not logging heartbeats, then the process may be assumed to have broken into the debugger. Using the processes in FIG. 1 as an example, assume that Process 3 calls the API function to wait for Processes 4, 5, and 6 to complete their initialization. Because Processes 5 and 6 run on remote computing devices, the API function sends a wait request to those remote devices. Each device waits on the processes local to it and then reports the results to Process 3. For each process in the wait list, the returned status may be Completed Initialization, Still Initializing, or Heartbeat Stopped. Using UUIDs in the same manner as in process monitoring, a process can wait for all of the processes in a dependency list or in a user-defined process group. Note that because non-WTT-based processes do not update their Heartbeat Time field, it cannot be assumed that these processes broke into the debugger.

When a job is divided into discrete processes, the processes often need to communicate among themselves to coordinate the tasks they perform. The API provides a generally useful signaling mechanism for this purpose in the form of Global Events. As an example, one particular event is the Controlled Shutdown. When a WTT-based process receives this event, it releases the resources it is using, reports its status, and performs a controlled shutdown. Users may define other Global Events and assign meanings to them. When a process receives an event, it responds in a fashion appropriate to the event's meaning. However, if a process receives an event it does not understand, it may terminate in an uncontrolled fashion. A process may use parent and group UUIDs to send an event to groups of processes.

An Exemplary Application Programming Interface

The services provided by the invention as described in the previous section are presented again in this section but with more attention paid to the details of an exemplary API. In its specific details, this embodiment is oriented towards use with Microsoft's "WINDOWS" operating system, but the principles are applicable to other environments. This section begins by describing the fundamental data structures used in this embodiment.

Note that UUIDs are sometimes called GUIDs (Globally Unique Identifiers).

The variable types TCHAR and Tstring are used in the definitions below to provide source code compatibility between Unicode and non-Unicode machines. If the parameter _UNICODE is defined during the build, then TCHAR is defined to be the Unicode's basic wide character type, "wchar_t," otherwise it becomes the standard ASCII 8-bit signed "char." Similarly, Tstring is a string of TCHARs and becomes either the Unicode wide string, "wstring," or ASCII "string."

1 WTTPROCESSPARAM

Describes the input parameters to the WTTCreateProcess call.

```
// From the winbase.h file.
#define MAX_COMPUTERNAME_LENGTH 31
// Type of processes: WTT-based or not.
#define WTT_PROC_TYPE_NONWTT_BASED   1
#define WTT_PROC_TYPE_WTT_BASED      2
// System processes and other non-WTT-based processes launched outside
// the scope of the API.
#define WTT_PROC_TYPE_SYSTEM_BASED   3
typedef struct _WTTPROCESSPARAM
{
    // Sizeof this structure (including this field). User needs to input a
    // value of sizeof(WTTPROCESSPARAM) for this.
    IN DWORD    dwStructSizeOf;
    // Flags. Reserved: must be zero (MBZ).
    IN DWORD    dwFlags;
    // Flags used in WTTCreateProcess.
    // Only CREATE_NEW_CONSOLE,
    // CREATE_NEW_PROCESS, and DETACHED_PROCESS are
    currently supported.
    IN DWORD    dwCreateProcessFlags;
    // Is this a WTT-based process?
    IN DWORD    dwProcessType;
    // The username and password to use when running the process. The
    // password is unencoded text but is encrypted before sending to
    the target device.
    IN TCHAR    *szUserName;
    IN TCHAR    *szPassword;
    // The command line to execute when starting the process.
    IN TCHAR    *szCommandLine;
    // NULL or a debugger string such as "ntsd -g".
    IN TCHAR    *szDebugger;
    // NULL or the UNC-style (e.g., \\machine\share\path...) name of a
    // generated log file.
    IN TCHAR    *szLogFile;
    // The directory where the process is created. Can be NULL, which
    // means use the current directory for launching the process.
    IN TCHAR    *szCurrentDirectory;
    // If the process was invoked remotely, then get the GUID from the
    // caller. From an external caller's perspective, this is not provided
    as an input.
    UUID        Guid;
    // This optionally identifies a group with which the process is
    associated.
    UUID        GroupGuid;
    // The GUID of the parent of this process. There may be a chain of
    // parent-child processes.
    UUID        ParentGuid;
    // The identity of the target computing device, for example, its name
    // or IP address.
    IN TCHAR    szTargetMachine
    [MAX_COMPUTERNAME_LENGTH + 1];
} WTTPROCESSPARAM, *PWTTPROCESSPARAM;
```

By associating a group GUID with a set of processes, processes can communicate with all the processes in the set. This is similar to a "process group" in Windows NT or Unix.

2 WTTPROCLISTINFO

Defines information relating to a process. WTTGetProcessListInfo returns this information. A pointer to this structure is passed as an input parameter to WTTOpenProcess. An application receives a handle to a process by calling WTTOpenProcess and can use that handle to monitor the process, even if the process was not created by the application.

```
typedef struct _WTTPROCLISTINFO
{
    // The GUID, Process ID, and type of the process. The process type
    can be:
    // WTT_PROC_TYPE_NON_WTT_BASED   (defined to be 1);
    // WTT_PROC_TYPE_WTT_BASED       (2); or
    // WTT_PROC_TYPE_SYSTEM_BASED    (4).
    UUID            Guid;
    DWORD           dwPid;
    DWORD           dwProcType;
    // These variables are meaningful only if the process is WTT-based
    // and is logging heartbeats. For non-WTT-based processes,
    // dwHBTime is zero and ulLastHBUpdateTime is the time the
    process was created.
    DWORD           dwHBTime;
    ULARGE_INTEGER  ulLastHBUpdateTime;
    // The number of seconds since the process was created (reported as
    // zero for non-WTT-based processes).
    DWORD           dwElapsedSeconds;
    // This is the status of the process. Its possible values are given below
    // in the section describing WTTGetProcessInfo. For non-WTT-based
    // processes, the reported status is
    WTTHANDLE_PROCSTATUS_UNDEFINED.
    DWORD           dwProcStatus;
    // The module name (not fully qualified with path).
    TCHAR           szModuleName[256];
} WTTPROCLISTINFO, *PWTTPROCLISTINFO;
```

3 WTTTHREADINFO

Holds information about a thread including the Thread Identifier and a list of comments. Comments may be pushed onto the stack, and the most recent comment may be popped off the stack and examined.

```
typedef struct _WTTTHREADINFO
{
    DWORD           dwThreadId;
    // The Standard Template Library (STL) contains
    type-parameterized classes.
    // slThreadCommentStack is an STL stack of STL strings.
    stack <string>  slThreadCommentStack;
} WTTTHREADINFO, *PWTTTHREADINFO;
```

4 WTTPROCESSINFO

Holds detailed process information.
```
typedef class _WTTPROCESSINFO
{
    // All members are public (can use a ctor and a dtor).
    public:
        DWORD       dwProcType;
        // Status of the process (initialized, debug break, terminated,
        // etc.) This is the same as in the WTTPROCLISTINFO
        // structure. That one is there for convenience only.
        DWORD       dwProcStatus;
        UUID        Guid;
        DWORD       dwProcPid;
        DWORD       dwProcExitCode;
        // Time elapsed since the creation of the process.
```

-continued
```
        ULARGE_INTEGER  ulElapsedTime;
        TCHAR           *pszModuleName;
        TCHAR           *pszCommandLine;
        TCHAR           *pszTargetMachine;
        // Singly-linked list of thread information (used to store
        // elements of type WTTTHREADINFO).
        list <PWTTTHREADINFO>  slThreadList;
        // List of log files associated with the process.
        list <string>          slLogList;
        // List of variations covered.
        list <string>          slVarnList;
    public:
        _WTTPROCESSINFO( )
        {
            pszModuleName = new TCHAR[MAX_PATH];
            pszCommandLine = new TCHAR[MAX_CMD_LINE];
            pszTargetMachine = new
                TCHAR[MAX_COMPUTERNAME_LENGTH + 1];
        }
} WTTPROCESSINFO, *PWTTPROCESSINFO;
```

5 WTTP_LOG_INFO

```
typedef struct _WTTP_LOG_INFO
{
    TCHAR   szLogFileName[128];    // UNC path of log file.
} WTTP_LOG_INFO, *PWTTP_LOG_INFO
```

6 HWTTPROCESS

This structure is opaque to the user and is used as a handle for future operations. This process-specific handle may be replaced by WTTHANDLE.

7 WTTHANDLE

This data structure is opaque to the user and is used as a handle for future operations. This handle is capable of handling objects no matter their type—whether processes, events, mutexes, etc. For "WINDOWS" implementations, this handle is similar to the handles used by Win32 processes.

```
typedef struct _WTT_HANDLE
{
    // The exit status of the process as would be returned by a local call
    // to the Win32 function GetExitCodeProcess( ).
    DWORD           dwStatus;
    // The Process Identifier of a created child.
    DWORD           dwProcID;
    // Was the process successfully created? If not, then this is set to
    // ERROR_SERVICE_NOT_ACTIVE.
    DWORD           dwProcCreationStatus;
    // This points to information such as the heartbeat timer, etc. This
    // field is opaque and only makes sense on the device on which the
    process is created.
    PWTT_SHAREDINFO pSharedInfo;
    // The current status of the process.
    DWORD           dwProcStatus;
    // Store the following data in the process handle. While marshaling
    // the parameters, the offsets are clearly defined and the strings are
    // put towards the end of the buffer.
    // If the call comes from a remote device, then get the GUID from the
    caller.
    UUID            Guid;
    TCHAR           *szCommandLine;
    // The following two parameters are supplied in case the process
    // needs to be launched by a specified user.
    TCHAR           *szUserName;
    TCHAR           *szPasswd;
    // Both for storage in the local process table and for redirection.
```

-continued

```
    TCHAR           *szTargetMachineName;
    TCHAR           *szModule;
    // The object type can be WTT_PROC_OBJECT,
    // WTT_EVENT_OBJECT, etc.
    DWORD           dwObjectType;
    PHANDLE         hObjectHandle;
} WTT_HANDLE, *WTTHANDLE;
```

Having presented the data structures used in this implementation, the following describes the function calls provided by the API.

8 WTTCreateProcess

Create a process, whether WTT-based or not. The user's input parameters are passed in as part of the WTTPROCESSPARAM structure. The returned structure pointer (pHWTTProcess) is opaque and is used in future calls. If UserName and Password are specified as part of the input structure, then the process is created with the logon credentials of the specified user.

The call is basically asynchronous in nature and returns as soon as possible after the process is successfully created or with a meaningful error value explaining why the process creation failed.

```
    DWORD WTTCreateProcess
    (
        IN OUT PWTTPROCESSPARAM  pWTTProcessParam,
        OUT WTTHANDLE            *pHWTTProcess
    );
```

Parameters:

pWTTProcessParam

Points to a structure of type WTTPROCESSPARAM, which contains the input parameters. Some of the fields in this structure are appropriately updated to store output values. For example, if the passed in GUID is "NIL" (see Note on UUIDs below), then the newly created GUID is stored when the function returns.

The following flags are supported in the WTTPROCESSPARAM structure's dwCreateProcessFlags field: CREATE_NEW_CONSOLE, CREATE_NEW_PROCESS, and DETACHED_PROCESS.

pHWTTProcess

An opaque pointer used in future calls to the API for accessing information about the process.

Return Values:

ERROR_SUCCESS if the process is successfully created, else Win32 error. In the latter case, the returned handle is NOT valid.

Implementation Notes:

This function assigns a GUID to the process that uniquely identifies the process no matter the device on which it runs. Then the function locks access to the process table and finds an empty slot in the table. Assigning the slot to the new process, this function stores in the slot the initial data for the process including its GUID, Parent GUID, Group GUID, etc. The parent of the process updates the heartbeat field and writes a zero value into the HB field. This makes it possible for the WTTWaitForMultipleObjects function to detect a DEBUG_BREAK that occurs before the creation of the Global Event.

If the process is to run on a remote device, then the parameters of the call are marshaled over the network and sent to the remote (target) device. The process is then created locally on the target device.

Once the new process starts, its status in the process table (the dwProcStatus field) is automatically updated.

9 WTTSignalProcesses

Send a signal to the processes in a set. The set may include both WTT-based and non-WTT-based processes. The global event handle is set for each process. One currently defined signal is "terminate the process." On receipt of that signal, a process cleans up after itself and performs a controlled stop. Sending a terminate signal is similar to sending a "kill" signal.

```
    DWORD WTTSignalProcesses
    (
        IN DWORD        nCount,
        IN WTTHANDLE    *phWTTProcess,
        IN DWORD        dwFlags
    );
```

Parameters:

nCount

The number of processes in the phWTTProcess array.

phWTTProcess

The set of processes to signal. This is an array of WTTHANDLEs for WTTProcesses as returned by the WTTCreateProcess and WTTOpenProcess functions.

dwFlags

The type of signal to send:

WTT_SIGNAL_PROCESS

Attempt a controlled stop by signaling the event associated with the process. It is the responsibility of non-WTT-based processes to check the global event.

WTT_TERMINATE_PROCESS

Force-terminate the process. This cannot be combined with WTT_SIGNAL_PROCESS.

WTT_TERMINATE_ALL_CHILDREN

This terminates all processes in a process tree. For every process in the process tree, internal process APIs are recursively used to terminate the children. The process table is searched to find all the descendents so that they can be signaled.

Return Values:

ERROR_SUCCESS if the signal is successfully sent, else Win32 error.

Implementation Notes:

For non-WTT-based processes, the standard global event handle is signaled. If a non-WTT-based process does not clean up within an acceptable period of time after being sent a WTT_SIGNAL_PROCESS signal, then the calling process can send a WTT_TERMINATE_PROCESS signal.

10 WTTWaitForMultipleObjects

Wait for processes in a set to achieve a specified status, but stop waiting if a timeout period expires. The function checks the heartbeats of all WTT-based processes, and if a process is not logging heartbeats, then it is assumed to have broken into the debugger. This function is often used to wait for processes to terminate. In that case, the different possible scenarios on returning from this function are as follows:

all processes stopped successfully;
some processes stopped successfully, and some processes broke into the debugger; and
some processes stopped successfully, some broke into the debugger, and some did neither but are still logging heartbeats.

In the last case, the function timed out before all the processes were finished so the function returns the value WAIT_TIMEOUT.

A debug break cannot be declared for a non-WTT-based process because this type of process does not log heartbeats.

DWORD WTTWaitForMultipleObjects

```
(
    IN DWORD        nCount,
    IN WTTHANDLE    *phWTTProcess,
    IN BOOL         fWaitAll,
    IN DWORD        dwTimeoutInSeconds,
    IN DWORD        dwDebugTimeoutInSeconds,
    IN DWORD        dwWaitType,
    OUT DWORD       *pdwSummaryStatus,
    OUT DWORD       *pdwSummaryIndex
)
```

Parameters:
nCount
The number of processes in the phWTTProcess array.
phWTTProcess
The set of processes stored as an array of WTTHANDLEs.
fWaitAll
TRUE means wait for all processes in the set. FALSE means wait for the first process to achieve the specified status.
dwTimeoutInSeconds
The function timeout period. The function waits no longer than this before returning. If a process does not achieve the specified status (e.g., terminated) during this period of time, its status is returned as WAIT_TIMEOUT.
dwDebugTimeoutInSeconds
If a process has not logged a heartbeat during this period, then the process is declared to have broken into the debugger. The value of this parameter may be smaller than the value of dwTimeoutInSeconds. A value of INFINITE is also possible which effectively ignores heartbeats.
If fWaitAll is TRUE, then the value of this parameter should be the maximum of the debug timeout values of all the processes in the monitored set.
dwWaitType
The type of status to wait for. These values cannot be combined. Many more statuses are possible; the following are currently implemented:
WTT_PROCESS INITIALIZE
Wait for the processes to complete their initialization.
WTT_PROCESS_TERMINATE
Wait for the processes to finish.
pdwSummaryStatus
The address to receive the first failure status of the array (or NULL if this information is not desired). This field is meaningful only if the return value is ERROR_SUCCESS and if fWaitAll is FALSE.
pdwSummaryIndex
The address to receive the index corresponding to the summary status (or NULL if this information is not desired).

Return Values:
ERROR_SUCCESS if all the processes successfully achieve the specified status.

WAIT_TIMEOUT if the timeout expires before all the processes achieve the specified status. In this case, *pdwSummaryIndex and *pdwSummaryStatus are undefined.

WTT_ERROR_DEBUG_BREAK if a process breaks into the debugger. *pdwSummaryStatus contains WTT_ERROR_DEBUG_BREAK and the index of that process in the phWTTProcess array is returned in *pdwSummaryIndex. There could be several processes in such a state in which case pdwSummaryIndex points to the first one.

Win32 if the function call fails.

Implementation Notes:
When processes in the set run on a distributed set of computing devices, there may be one thread per process (or one per computing device) which the overall thread monitors.

For non-WTT-based processes, dwLastHBUpdateTime is the time the process was created and is not updated. No debug break can be declared for these processes.

11 WTTGetProcessInfo
Query the status of a process that was launched by the WTTCreateProcess function. After reviewing the information returned, WTTFreeProcessInfo is called to release the memory allocated by this function.

```
DWORD WTTGetProcessInfo
(
    IN WTTHANDLE         phWTTProcess,
    OUT PWTTPROCESSINFO  *ppWTTProcessinfo
);
```

Parameters:
phWTTProcess
Process information is stored in a WTTHANDLE structure. The handle could have been obtained either by a call to WTTCreateProcess or by a call to WTTOpenProcess (after a call to WTTGetProcessListInfo).
Additionally, this could have a value of NULL. In that case, the information returned pertains to the process that called this function. This is useful when a non-WTT-based process wishes to get GUID information about itself, which it can then use to open a handle to the Global Event.
ppWTTProcessinfo
This stores information about the process being queried. The information includes the threads present, the stack of thread comments for each thread, a list of log files that this process monitors, and a list of variations completed by the process.

Return Values:
ERROR_SUCCESS if the request is successfully processed, else Win32 error.

Implementation Notes:
For WTT-based processes, the following information is returned:
a list of the threads present in the process;
a stack of comments stored on a per-process basis;
a list of log files that are directly created by the process;
a list of variations covered by the process;
the module name;
the type of the process (WTT_PROC_TYPE_WTT_BASED); and
the current state of the process.

The data returned are stored in the form of simple link lists or stacks. Small routines are provided to return the size, traverse, and list the contents of the lists or stacks.

For non-WTT-based process, a list of thread identifiers, the module name, the type of the process, and the current state of the process are returned. The current state of the process may not be very accurate because non-WTT-based processes do not log heartbeats.

The process statuses are:
WTTHANDLE_PROCSTATUS_UNDEFINED
WTTHANDLE_PROCSTATUS_INITIALIZED
WTTHANDLE_PROCSTATUS_RUNNING
WTTHANDLE_PROCSTATUS_GE_CREATED (The Global Event is ready for signaling.)
WTTHANDLE_PROCSTATUS_TERMINATED
WTTHANDLE_PROCSTATUS_DEBUG_BREAK
WTTHANDLE_PROCSTATUS_HANDLE_CLOSED The macro GET_PROC_STATUS(pWTTProcessinfo->dwProcStatus) returns a string corresponding to the process status.

12 WTTFreeProcessInfo

Release the memory allocated within the WTTPROCESSINFO structure during a WTTGetProcessInfo function call.
DWORD WTTFreeProcessInfo(IN PWTTPROCESSINFO *ppWTTProcessinfo);

Parameter:
ppWTTProcessinfo
Pointer to a pointer to a structure containing information about a process returned by a call to WTTGetProcessInfo.

Return Values:
ERROR_SUCCESS if the allocated memory is successfully released, else Win32 error. The pointer to the WTTPROCESSINFO structure is not defined after a call to this function.

13 WTTGetProcessListInfo

Get the process list from the target machine's process table. The information returned varies depending upon the values specified in dwFlags. Memory allocation is done within the function call itself. WTTFreeProcessListInfo is called to release the memory after reviewing the information returned.

```
DWORD WTTGetProcessListInfo
(
    IN LPCTSTR          pszMachine,
    BOOL                bResolveRemote,
    IN DWORD            dwFlags,
    OUT DWORD           *pdwCount,
    OUT PWTTPROCLISTINFO *ppWTTProcessListInfo
);
```

Parameters:
pszMachine
The name of the computing device from which to retrieve the process table information.
bResolveRemote
TRUE means remote entries should be resolved. In that case, extra heartbeat-related information is retrieved for processes initiated by WTTCreateProcess on the computing device specified by pszMachine. A query is made to that remote device.
dwFlags
Include_wtt_based_procs
Include all WTT-based processes created by WTTCreateProcess or otherwise.
Include_Non_wtt Based_Procs
Include non-WTT-based processes created by WTTCreateProcess.
Include_System_Procs
GUID is displayed as NULL for these. WTTOpenProcess cannot be called for processes of this type.
pdwCount
Pointer to the number of elements in the ppWTTProcessListInfo array.
ppWTTProcessListInfo
An array of output information for the processes.

Return Values:
ERROR_SUCCESS if the information is successfully retrieved, else Win32 error.

Implementation Notes:
During the marshaling of parameters to a remote device, pszMachine is marshaled into the szTargetMachine field of the buffer.

This function needs to carefully check to see if a process actually exists. If the entry for a particular process is present in the <GUID>.ini file but not present in the process table, then the process no longer exists. There is a problem, however, because there may be entries in the process table for processes that have exited. This happens only if a WTT-based process is killed with a forced kill signal. Even doing an OpenProcess( ) on the process identifier (PID) is not a foolproof check as the PID could have been recycled. The solution is to use the Phandle pointer in the process table (on the local machine where the process was instantiated) to wait on the Process Handle with a timeout of zero. If the process is gone, then Phandle is signaled immediately.

When returning the list of process information, allocate space for one more than the total number of entries returned. The last entry is a "NULL": NIL for GUIDs and ZERO for DWORDS.

14 WTTFreeProcessListInfo

Release the memory allocated during a WTTGetProcessListInfo function call.

```
DWORD WTTFreeProcessListInfo
(
    IN PWTTPROCLISTINFO   *ppWTTProcessListInfo
);
```

Parameter:
ppWTTProcessListInfo
The array for which memory is to be released.

Return Values:
ERROR_SUCCESS if the allocated memory is successfully released, else Win32 error.

15 WTTTailLog

Retrieve a copy of output as it is added to a log file. The effect is that of a distributed "tail-f" command. A callback allows this function to return asynchronously.

```
DWORD WTTTailLog
(
    WTTHANDLE          pWTTProcInfo,
    WTTP_LOG_INFO      *pWTTLogInfo,
    DWORD              dwBytes,
    WTTPROC_CALLBACK   CALLBACKFUNCTION
);
```

Parameters:
pWTTProcInfo
Information about the process of interest to be passed over to the remote device.
pWTTLogInfo
This structure contains the log information. It includes the UNC path of the log file. If this pointer is NULL, then the first log file is used, as specified in the <GUID>.ini file.
dwBytes
The number of bytes to be retrieved. If this is set to the value WTTPROCESS_FULL_LOGSIZE, then entire log files are retrieved.
CALLBACKFUNCTION
Register a callback function with the spsrv service to retrieve data (the tail of the log file) asynchronously.

Return Values:
ERROR_SUCCESS if the log file stream is successfully initialized, else Win32 error.

16 WTTCancelTailLog
Cancel the effect of a previous call to WTTTailLog.

```
DWORD WTTCancelTailLog
(
    WTTHANDLE       pWTTProcInfo,
    WTTP_LOG_INFO   *pWTTLogInfo
);
```

Parameters:
pWTTProcInfo
Information about the process of interest to be passed over to the remote device.
pWTTLogInfo
This structure contains the log information. It includes the UNC path of the log file. If this pointer is NULL, then cancel all tail logs for the process identified by the pWTTProcInfo parameter.

Return Values:
ERROR_SUCCESS if the cancellation is successful, else Win32 error.

17 WTTOpenProcess
Get a WTT process handle.

```
DWORD WTTOpenProcess
(
    IN WTTPROCLISTINFO   *pWTTProcessInfo,
    OUT WTTHANDLE        *pWTTProcInfo
);
```

Parameters:
pWTTProcessInfo
A pointer to the element in the array retrieved by WTTGetProcessListInfo that concerns the process of interest.
pWTTProcInfo
A returned pointer to a handle to the process of interest.

Return Values:
ERROR_SUCCESS if the handle is successfully retrieved, else Win32 error.

Implementation Notes:
The handle has information like the GUID of the process, the name of the device on which the process runs, etc. Once the handle is received, it is more efficient to store its information in a local process table and to then call WTTCloseHandle to release the memory.

18 WTTCloseHandle
Close a WTT process handle. This releases the memory allocated by the WTTOpenProcess call. The local process table entry created for the process is marked as invalid.
DWORD WTTCloseHandle(WTTHANDLE *pWTTProcInfo);

Parameter:
pWTTProcInfo
A pointer to a handle to the process of interest.

Return Values:
ERROR_SUCCESS if the handle is successfully closed, else Win32 error.

19 WTTConsoleOutput
Provide console output for a process. A callback allows this function to return asynchronously.

```
DWORD WTTConsoleOutput
(
    WTTHANDLE           pWTTProcInfo,
    WTTPROC_CALLBACK    CALLBACKFUNCTION
);
```

Parameters:
pWTTProcInfo
Process information stored in a WTTHANDLE structure.
CALLBACKFUNCTION
Register a callback function with the spsrv service to retrieve data asynchronously Return Values:
ERROR_SUCCESS if the console output stream is successfully initialized, else Win32 error.

20 WTTCancelConsoleOutput
Cancel the console output associated with a particular process.
DWORD WTTCancelConsoleOutput(WTTHANDLE pWTTProcInfo);

Parameter:
pWTTProcInfo
Process information stored in a WTTHANDLE structure.

Return Values:
ERROR_SUCCESS if the cancellation is successful, else Win32 error.

21 WTTSetLogFile
Add a log file to the list of log files to which a process logs.

```
DWORD WTTSetLogFile
(
    WTTHANDLE   pProcessInfo,
    LPCWSTR     pszLogFile
);
```

Parameters:
pProcessInfo
Process information stored in a WTTHANDLE structure.
pszLogFile
The name of the log file to add to the list.

Return Values:
ERROR_SUCCESS if the log file is successfully added to the list, else Win32 error.

22 WTTPROC_CALLBACK

The functions WTTTailLog and WTTConsoleOutput use callback functions to allow them to return asynchronously. The structure of the callback function is as follows:

```
typedef DWORD (*WTTPROC_CALLBACK)
(
    SOCKET  hSocket,
    LPVOID  pData,
    DWORD   dwBytes
);
```

23 Note on UUIDs

UUIDs (also called GUIDs) provide unique designations of objects such as processes, interfaces, manager entry-point vectors, and client objects. In practice, these identifiers need only be unique within the context of their use, that is, within the set of communicating computing devices. Because techniques already exist for making the identifiers truly unique, those techniques are used here.

```
typedef struct _GUID
{
    unsigned long   Data1;
    unsigned short  Data2;
    unsigned short  Data3;
    unsigned char   Data4[8];
} GUID;
typedef GUID UUID;
```

Members:
Data1
The first eight hexadecimal digits of the UUID.
Data2
The first group of four hexadecimal digits of the UUID.
Data3
The second group of four hexadecimal digits of the UUID.
Data4
An array of eight elements. The first two elements of the array contain the third group of four hexadecimal digits of the UUID. The remaining six elements contain the final twelve hexadecimal digits of the UUID.

Remarks:

For implementations based on Microsoft's "WINDOWS" operating systems, the following standard Win32 functions are used to create, compare, and manipulate UUIDs. Other implementation platforms provide similar functions.

```
signed int RPC_ENTRY UuidCompare
(
    UUID        *Uuid1,
    UUID        *Uuid2,
    RPC_STATUS  *Status
);
RPC_STATUS RPC_ENTRY UuidCreate(UUID *Uuid);
RPC_ENTRY UuidCreateNil(UUID *Nil_Uuid);
RPC_STATUS RPC_ENTRY UuidFromString
(
    unsigned char   *StringUuid,
    UUID            *Uuid
);
RPC_STATUS RPC_ENTRY UuidToString
(
    UUID            *Uuid,
    unsigned char   **StringUuid
);
```

24 Note on Non-WTT-Based Processes

A suitable infrastructure is provided for tagging and monitoring non-WTT-based processes. Every non-WTT-based process created by the WTTCreateProcess function is given a WTT-created GUID for tagging. The GUID is stored in the WTT-based process handle for future tracking purposes.

A Global Event handle is present for every non-WTT-based process. The naming structure of this handle is "Event\\<GUID>" and it is present on the device on which the process is created. When a non-WTT-based process is created, it has the option of waiting on this event handle and performing a clean shutdown if requested.

25 Note on Locking

Central to the implementation of this API is the process table. The process table has row-level exclusive locks and a global process table lock that over-rides the row-level locks.

There are at least six points in time when locking comes into play:

(a) When the parent process looks for an empty slot in the process table for the new child process;
(b) When the parent process reserves a slot in the process table by writing in the GUID of the child process, the GUID of the parent process, a Group GUID (if any), the time the child process was created, the Heartbeat Time, the Source Device, the Target Device, and the Process Type (WTT-based or non-WTT-based) (see FIG. 4 and accompanying text for a description of these fields);
(c) When the child process soon after creation writes in its process identifier and the heartbeat time;
(d) When a process periodically updates the Heartbeat Time;
(e) When multiple processes are querying either at the row level or at the process table level; and
(f) When a WTT-based process is created outside the scope of this API. It looks for a slot in the process table and then gives itself a GUID for identification.

Considering all these, a global lock (mutex) is needed whenever a write affects the entire process table, as in cases (a), (b), and (f) above. A row-level exclusive lock is needed (after acquiring the global process table) when updating process-specific information, as in cases (c), (d), and (e) above.

Specific Considerations When Communicating with Remote Processes

While the invention is useful when all processes run on the same computing device, it is also designed for the case when some processes run remotely. This section discusses specific considerations that come into play when the API supports remote processes.

PWTTPROCESSINFO contains a field called szDestMachine that holds the value of the target device on which the process runs. If the value is NULL, then the call is local. If not, the command and its parameters are sent to the target device, and the results are piped back to the originating device. All calls are synchronous in nature. So, if the target device crashes during the period of passing the command, an appropriate error is returned.

The need to pass by value argues for using Remote Procedure Calls (RPC) as a message-passing paradigm. On the other hand, if all input parameters to a call are based on parameters passed only by value, then interfaces (function tables) for the call can be set up and the spsrv service used to handle the commands on the remote device. Another consideration is that if 32-bit-based machines communicate with IA64 cluster machines, then RPC is very useful as it takes care of architectural differences. RPC interfaces are flexible in terms of marshaling both pointer-based and value-based parameters.

Every time a new API call is made, a new GUID may be generated on the device that initiated the call. This GUID is used to "track" the call. The GUID is sent with the call to the target device. The target device keeps track of the GUID. If the target device crashes, then the target device, after re-booting, "calls back" its parent device with the knowledge of the GUID of the last call and the name or IP address of the parent device.

For every process created on a particular device, a <GUID>.ini file is created in the %windir%\WTTbin\GUID directory. (For non-"WINDOWS" implementations, a similar directory is used.) This directory stores information about the process, its threads, and its stack comments. The files store information more persistently than can memory and prevent having to use memory for ever-changing, bulky data. A process is free to update the information in its file whenever the thread comments are updated. If a query about the state of a process is made and if the process no longer has an entry in the process table, but a <GUID>.ini file exists, then the status of the process is updated to ERROR_SERVICE_NOT_ACTIVE. Due to the presence of multiple threads possibly operating simultaneously on this file, synchronization is important. A cleanup routine removes .ini files three or more days old. This is the structure of a <GUID>.ini file:

```
[GLOBAL]
GGUID = nnn
PID = nnn
Status = WTT_PROCESS_RUNNING   // Or some other status.
[LogFiles]
<Log1.log>
<Log2.log>
[<ThreadId1>]
Comment1
Comment2
...
[<ThreadId2>]
Comment1
Comment2
...
```

For marshaling parameters for a function call, the spsrv service has a function table that is used to form the receive and send stubs for the spsrv service running on the remote device. To form the stub for receiving data, the buffer is as generic and as flexible as possible. It identifies the function, determines the number of parameters, and sets a fixed order of parameters depending on the function. The following structure is used. It is marshaled into a byte buffer, sent out the socket, and un-marshaled on the other end. When the call completes, the same procedure gets the returned value of the call.

```
// This is the index into the function dispatch table on the remote device.
DWORD   dwTestAPINum;
// This usually corresponds to nCount.
DWORD   dwNumHWTTProcesses;
// Offset into the non-variable-length buffers.
DWORD   dwHWTTProcOffset[MAX_PROCS];
// The number of processes present in the
// WTTPROCESSMARSHALPARAM structure (see below).
DWORD   dwNumMPProcesses;
// Offset into the non-variable-length buffers.
DWORD   dwNumMPOffset[MAX_PROCS];
// The total number of bytes taken up by the buffer.
DWORD   dwBytesForBuffer;
DWORD   dwNumWTTPLogInfo;
// Offset into the non-variable-length buffers.
DWORD   dwNumWTTPLogOffset[MAX_PROCS];
DWORD   dwNumWTTPProcListElem;
// Offset into the non-variable-length buffers.
DWORD   dwNumWTTPProcListOffset[MAX_PROCS];
DWORD   dwWaitTimeout;
DWORD   dwFlags;
DWORD   dwWaitAll;
DWORD   dwBytes;
// Now for storage for the variable-length data fields.
(dwNumHWTTProcesses * sizeof(_M_HWTTPROCESS))
(dwNumMPProcesses * sizeof(WTTPROCESSMARSHALPARAM))
(dwNumWTTPLogInfo * sizeof(WTTP_LOG_INFO))
(dwNumWTTPProcListElem * sizeof(WTTPROCLISTINFO))
```

The WTTPROCESSMARSHALPARAM structure is based on WTTPROCESSPARAM but each instance of a TCHAR * field is replaced by a DWORD dwLen<sss>and a CHAR *szStr<sss> containing a string and a NULL character. The variable-length data are moved to the end of the buffer so as not to affect the offsets of the non-variable-length fields. The dwLen<sss> length information is stored with the help of the offsets. Each GUID is converted to a string, marshaled, and then re-converted into a GUID on the target device. WTTPROCESSMARSHALPARAM is as follows:

```
typedef struct
{
    DWORD   dwFlags;            // Flags; currently a reserved
                                field. Input.
    DWORD   dwCreateProcessFlags; // Flags used in CreateProcess.
                                Input.
    DWORD   dwProcessType;      // Is this a WTT-based process?
                                Input.
    DWORD   dwOffSets[25];      // Offsets to the variable-length
                                strings.
    Void    *pBuf;
    ...
} WTTPROCESSMARSHALPARAM,
*PWTTPROCESSMARSHALPARAM;
```

The variable-length strings in WTTPROCESSMARSHALPARAM include szUserName, szPasswd, stCommandLine, stDebugger, stClusterName, stLogFile, szGuid, szGroupGuid, szParentGuid, szSourceMachine, and szTargetMachine.

The output buffer for most calls contains the following information: information in HWTTPROCESS, marshaled as _M_HWTTPROCESS; dwSummaryStatus; and dwSummaryIndex. Variable-length data are put at the end of the buffer. For WTTGetProcessListInfo, a list is formed of entries containing information about the processes of interest. The information carried back is as follows: a list of threads present including their thread identifiers; a list of comments on a per-thread basis; and a list of variations completed by the process. The data structures useful for marshaling this data are as follows:

```
Struct _WTTP_THREAD_INFO
{
    DWORD dwThreadId;
    // Offset into the comments strings for a thread.
    DWORD dwCommentOffset
        [MAX_COMMENTS_PER_THREAD];
}
Struct _WTTP_VARIATION_INFO
{
    // Offset into the variable-length name strings.
    DWORD dwVarnNameOffset[MAX_VARNS];
}
Struct _WTTP_LOG_INFO
{
    // Offset into the log strings.
    DWORD dwLogOffset[MAX_LOGS_PER_PROC];
}
The structure of the marshaling buffer is as follows (no
pointers are passed):
    // The size of this entire buffer in bytes.
    DWORD dwBuffSize;
    DWORD _dwThreadCount;
    // All fixed-length data for threads (i.e., the thread identifier
    // and the offsets for the comments) go here while the actual
    comments are in the variable-length section.
    Struct _WTTP_THREAD_INFO      *pThreadInfo;
    DWORD                          _dwVariationCount;
    Struct_WTTP_VARIATION_INFO    *pVarnInfo;
    DWORD                          _dwLogCount;
    Struct_WTTP_LOG_INFO          *pLogInfo;
    (The variable-length data go here.)
```

To be exported are the following 2 variables:
PDWORD pdwThreadCount;
PWTTPROCESS_THREAD_INFO *pThreadInfo;

WTTGetProcessListInfo retrieves information about a set of processes. Its return buffer contains the following information:

```
// The size of this entire buffer in bytes.
DWORD   dwBuffSize;
// The number of processes whose information is returned in this buffer.
```

-continued

```
DWORD   dwProcs;
DWORD   dwProcInfoOffset[WTT_MAX_PROCS];
DWORD   dwProcessId;
DWORD   dwGuidOffSet;
DWORD   dwSrcMcOffset;
DWORD   dwDestMcOffset;
DWORD   _dwProcListCount;
// The time of the last recorded heartbeat is split into two parts.
DWORD   LastHBTimeHighDword;
DWORD   LastHBTimeLowDword;
DWORD   dwHeartBeat;
```

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A method for requesting a remote system to create a new process, the method comprising:
    calling, by a local system, an Application Programming Interface create process function with a null-value UUID (Universally Unique Identifier) input parameter and receiving, by the local system, a non-null-value UUID with a return of the create process function; and
    issuing, by the local system, a create process call with input parameters comprising a type of the new process, the non-null-value UUID for the new process, and a command line for a remote system to execute to initiate the new process, wherein the non-null-value UUID uniquely identifies the new process across both the local and remote systems; and
    receiving, by the local system from the remote system, an acknowledgement of the create process call with acknowledgement parameters comprising a handle to information related to the new process.

2. A computer-readable storage medium having instructions that when executed by at least one processor cause the at least one processor to perform the method of claim 1.

* * * * *